Patented May 16, 1950

2,507,910

UNITED STATES PATENT OFFICE 2,507,910

PROCESS FOR BREAKING PETROLEUM EMULSIONS

Bernhard Keiser, Webster Groves, and Melvin De Groote, St. Louis, Mo., assignors to Petrolite Corporation, Ltd., Wilmington, Del., a corporation of Delaware No Drawing. Application January 26, 1949, Serial No. 73,006

7 Claims. (Cl. 252—331)

This invention relates to processes and procedures particularly adapted for preventing, breaking, or resolving emulsions of the water-in-oil type and particularly petroleum emulsions.

Our invention provides an economical and rapid process for resolving petroleum emulsions of the water-in-oil type which are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as a crude oil, and relatively soft waters or weak brines. Controlled emulsification and subsequent demulsification under the conditions just mentioned are of significant value in removing impurities, particularly inorganic salts, from pipeline oil.

Demulsification as considered in the present application includes the preventive step of commingling the demulsifier with the aqueous component which would or might subsequently become either phase of the emulsion in the absence of such precautionary measure. Similarly, such demulsifier may be mixed with the hydrocarbon component.

The present invention involves the use, as a demulsifier, of an oxyalkylated infusible synthetic resin, in which the alkylene radicals of the oxyalkylene groups are ethylene, propylene, butylene, hydroxypropylene, or hydroxybutylene, corresponding to the alpha-beta alkylene oxides, ethylene oxide, alpha-beta propylene oxide, alpha-beta butylene oxide, glycide, and methyl glycide, respectively.

We have also found that the derivatives of such oxyalkylated infusible resins which bear a simple genetic relationship to such parent materials retain the demulsifying properties of such parents. For instance, demulsifying power persists in the products obtained by reacting such oxyalkylated compounds with low molal carboxy acids, high molal carboxy acids, polycarboxy acids or their anhydrides, alpha-chloro monocarboxy acids, epichlorohydrin, etc.

The infusible resins which are oxyalkylated to produce the reagents of our process are of various kinds, and may be prepared by various procedures. Because it is usually very desirable to subject them to oxyalkylation in the form of small particles, they are preferably obtained by the procedures described in two co-pending applications, Serial Nos. 73,017 (now abandoned) and 73,018, of Eberz, both filed January 26, 1949. The following quoted subject-matter is taken verbatim from said Eberz applications.

Application Serial No. 73,017 states:

"My procedure consists essentially in mixing or emulsifying a phenol, modified phenol, or counterpart and a suitable polymerization catalyst into an aqueous system containing a suitable emulsifying agent, and adding the second reactant, usually an aldehyde, which serves to convert the first reactive substance into a finished resin. Other substances, such as urea, melamine, and thiourea, may be substituted for the phenolic reactant, either singly or in mixture with each other or with the phenol. When reacted with aldehydes, particularly formaldehyde, in my procedure, they all yield excellent finely-divided, infusible resins. Instead of formaldehyde, the second reactant may be paraldehyde, glyoxal, furfural, crotonaldehyde, a ketone like acetone or methylethyl ketone, etc.; or mixtures of two or more of such reactants may be employed.

"I have not found alkaline polymerization catalysts as generally useful as acidic catalysts, in producing my products, possibly because resinification usually takes place comparatively much more slowly in alkaline media than in acidic media. While mineral acids are usable as catalysts, I greatly prefer to employ organic acidic materials for this purpose. Among such preferred catalytic reagents, I have employed the alkylaryl sulfonic acids, such as dipropylnaphthalene sulfonic acid and p-tertiary amylphenol sulfonic acid, with best success. In some instances, however, e. g., where furfural is employed as a reactant, an alkaline catalyst may be preferred to an acidic one.

"It is not strictly necessary that the second reactant, usually formaldehyde, be added after the introduction of the first reactant into the aqueous medium. It is equally feasible to employ it in solution or emulsion in the water, and to add the first reactant thereto. For convenience of control, however, I generally prefer to emulsify the phenolic equivalent into the aqueous system, and to add the aldehydic equivalent last.

"Where it is desired to employ two or more reactants of the same class, as two aldehydes, in conducting a resinification reaction, I find it convenient to introduce first the least reactive, and then progressively the more reactive materials. For example, if formaldehyde and furfural are to be employed to react with a phenol, I first react the furfural and phenol, under anhydrous conditions, with a suitable catalyst present, continuing the reaction at the required temperature until the furfural is consumed. I then emulsify the resultant liquid into the aqueous system, and add the formaldehyde, the more reactive aldehyde, and heat to complete the reaction. In this particular example, it may be desirable to react the furfural in the presence of an alkaline catalyst like sodium carbonate, but to employ an acidic medium containing a suitable acidic catalyst for the formaldehyde reaction.

"Such procedure allows the use of higher temperatures for reaction between the phenol and the less reactive aldehyde than would be attainable in aqueous suspension. The maximum temperature in such aqueous systems is obviously determined by the boiling point of water; although this limitation may be circumvented to some extent by operating at super-atmospheric pressures during the reaction.

"Reactants other than aldehydes may be employed in the anhydrous reaction stage, such as acetone with phenol. The only limitation is that the reaction should not be carried to the point of producing a solid which melts at a temperature higher than about the boiling point of water. If such a solid were produced, its emulsification with water would obviously be impossible. It need hardly be pointed out that the functionality of the first reactant must not be destroyed by its reaction with the first member of the second class of reactants, as this would prevent its reaction with subsequently added members of such second class of reactants.

"As a suitable emulsifying agent, I may employ any effective substance which does not react sufficiently fast with the essential ingredients of the mass to be destroyed, which does not take part in troublesome side reactions, and which does not enter into the body of the resin formed and plasticize it undesirably. Gum acacia is a most effective emulsifier for my purpose. In some systems, it may be desirable to employ some other emulsifier, such as other vegetable gums, or polyoxyethylated sorbitol; but I have not found any of such other emulsifiers superior to gum acacia as the emulsifier in my procedure. Of all the emulsifying agents I have examined, I greatly prefer to employ gum acacia. This emulsifier is preferably used as a 2% aqueous solution, although its concentration is not critical, and may be 1% or even less in some instances, especially when the reactants condense rapidly to produce infusible resins. Its upper limit of concentration is usually determined by cost, although incorporating too much of it into a resin may confer undesirable characteristics on the product.

"The proportion of aqueous phase is also not critical. I prefer, however, to use about two volumes of aqueous phase to one volume of non-aqueous components. If this proportion is reduced too much, it tends to promote emulsion instability. If increased greatly, it entails handling excess volumes of emulsion.

"Where the reactants are all highly soluble in water, the system may initially be a single phase; but on formation of the resin, the system becomes a suspension of the latter, with properties similar to those of resins made from water-immiscible reactants.

"The following examples illustrate a few of the very many different products obtainable by application of this principle or procedure. They are exemplary only; I do not wish to be limited to them.

"Example 1

"The all-glass equipment consisted of a 1.5-liter 3-neck reaction flask, provided with reflux condenser, motor stirrer, thermometer well beneath the normal liquid level, electric jacket heater, and separatory funnel for introducing reactants. Gum acacia, 6 g., was stirred into 320 g. of water at 80° C. in the flask, solution soon being complete. A mixture of 5 g. dipropylnaphthalene sulfonic acid and 94 g. of phenol (hydroxybenzene), at 80° C., was poured into the stirring gum acacia solution. The system became a single phase. Then, 100 ml. of commercial formalin (assay, 36 g. formaldehyde per 100 ml. solution) was run into the flask. After refluxing about 0.5 hour at 99° C., the flask contents became turbid; and the turbidity increased to a heavy chalk-white suspension in 20-30 minutes. After a total of 3 hours' refluxing, a small sample was tested; the product was found to be a finely-divided infusible resin. Total time of refluxing and stirring was extended to 7 hours without loss of stability by the system or other misadventure. The product was purified by repeated water washing and decantation, followed by drying.

"Example 2

"In the apparatus of Example 1, 94 g. phenol, 36 g. methylethylketone, and 5 g. dipropylnaphthalene sulfonic acid were mixed at 40° C. The mixture was slowly heated with stirring about 2 hours, until a temperature of 133° C. was reached. The system was cooled to 100° C. and a solution of 6 g. gum acacia in 320 g. water, at 100° C., was added without stirring. The mass was then stirred vigorously, and the emulsion was formed as in preceding example. The preparation of the product was completed by running in 110 ml. commercial formalin at 95° C. while stirring, and the stirring for 3 hours more at this temperature. The product was an infusible, white, very-finely-divided solid. It was purified by water washing and decantation, as before.

"Example 3

"A solution of 6 g. gum acacia in 320 g. water was heated to 90° C. in the apparatus of Example 1. Into the stirring solution was poured, at 90° C., a mixture of 150 g. cardanol (treated cashew nutshell liquid), 10.8 g. m-cresol, and 5 g. dipropylnaphthalene sulfonic acid. The suspension produced was treated with 112 ml. commercial formalin at 97° C.; and yielded an infusible, finely-divided product in 2.5 hours. The run was stopped after 7 hours, no further change being apparent.

"Example 4

"Into the apparatus of Example 1 were charged 94 g. phenol (hydroxybenzene), 120 g. furfural and 25 ml. of 2N sodium hydroxide solution. This was stirred with heating until the temperature rose to 105° C., in the course of 5 hours. The system was then acidified with 10 ml. of 6 N sulfuric acid. It was next emulsified into a solution of 320 g. of water, 6 g. gum acacia, and 5 g. of dipropylnaphthalene sulfonic acid at 100° C. This emulsion was kept just under 100° C. for 9.5 hours, and was then cooled and the product recovered. It was a jet black, somewhat coarsely granular resin, infusible at 260° C.

"Example 5

"Into the apparatus of Example 1 were charged 90 g. urea, 1 g. dipropylnaphthalene sulfonic acid, 320 g. water and 6 g. gum acacia. This mixture was stirred until dissolved, at room temperature. It was then heated to 98° C., and 187 ml. of commercial formalin was added during the course of 6 minutes. A fine white suspension soon formed. After 6 hours, the product was recovered as usual. It was a finely-divided white solid, infusible at 260° C.

"Example 6

"Into the apparatus of Example 1 were charged 47 g. phenol (hydroxybenzene), 30 g. urea, 1 g. dipropylnaphthalene sulfonic acid, and a solution of 6 g. gum acacia in 320 g. of water. This mixture was heated to 100° C. with stirring; and 125 ml. of commercial formalin was run in in 5 minutes. After 2 hours' heating and stirring at 99° C., the system was cooled and the product recovered. It was a finely-divided white solid which decomposed at 260° C., sintering to a soft, yellow mass.

"Example 7

"Into the apparatus of Example 1 were charged 151 g. cardanol (treated cashew nutshell liquid) and 5 g. dipropylnaphthalene sulfonic acid. The system was heated to 110° C. with stirring; and 11 g. paraldehyde was added in 3 minutes. The temperature was increased to 150° C. in 37 minutes, and then reduced to 98° C. This intermediate was emulsified into a solution of 6 g. gum acacia in 320 g. water at 100° C. There was then introduced 42 ml. of commercial formalin solution, the addition consuming 6 minutes. After 5 hours, the system was cooled and the product recovered. It was a finely-divided solid, infusible at 250° C.

"Example 8

"Into the apparatus of Example 1 were charged 28 g. phenol (hydroxybenzene), 105 g. p-secondary butylphenol, and 5 g. dipropylnaphthalene sulfonic acid. This mixture was emulsified at 100° C. into a solution of 6 g. gum acacia in 320 g. water. There was next introduced 100 ml. commercial formalin, addition requiring 1 minute. A creamy, white, fine emulsion was formed. After 6.5 hours, the emulsion had changed to a beige-colored suspension of solids. The product was recovered as usual. It was infusible at 250° C.

"Example 9

"Into the apparatus of Example 1 were charged 94 g. phenol (hydroxybenzene), 5 g. dipropylnaphthalene sulfonic acid, and 20 g. crotonaldehyde. This reacting mixture was maintained at approximately 100° C. for 2 hours, and was then emulsified into a solution of 6 g. gum acacia in 320 g. water. There was next introduced 90 ml. of commercial formalin, addition requiring 7 minutes. After 4 hours, the system was cooled and a finely-divided beige-colored product, infusible at 250° C., was recovered.

"Example 10

"Into the apparatus of Example 1 were charged a solution of 6 g. gum arabic in 320 g. of water, 114 g. 2,2-bis(4-hydroxyphenyl)-propane, (Bisphenol-A), and 5 g. dipropylnaphthalene sulfonic acid. With the solution stirring at just under 100° C., there was added 91 g. of 31.7% aqueous glyoxal solution, addition requiring 1 minute. After 1 hour of stirring at 100° C., there was introduced 58 ml. commercial formalin solution, addition requiring 4 minutes. After an additional 90 minutes, the run was terminated and an infusible, finely-divided product was recovered.

"Example 11

"The apparatus described under Example 1, above, was used to prepare an infusible resin, as follows: Gum acacia, 6 g., was stirred into 320 g. water in the flask, at 80° C., solution being soon complete. A mixture of 123 g. (0.75 mol) p-tertiary amylphenol, 23.5 g. (0.25 mol) phenol (hydroxybenzene), and 5 g. dipropylnaphthalene sulfonic acid, at 80° C., was poured into the stirring gum acacia solution. A fine emulsion formed at once. Formalin, 112 ml. (36 g. in 100 ml.), was then introduced over a four-minute period, while stirring was continued and temperature was maintained at about 80° C. The temperature was raised to about 96° C., and maintained at that level for 6 hours, stirring continuing. The mass was allowed to cool and settle, after which it was washed with water by decantation several times, and then air-dried. The product was a fine powder, infusible at 250° C.

"Example 12

"In the same apparatus and by substantially the same technique as described under Example 1, above, were reacted: 123 g. (0.75 mol) p-tertiary amylphenol, 27.5 g. (0.25 mol) resorcinol, 5 g. dipropylnaphthalene sulfonic acid, and 100 ml. formalin (36 g. in 100 ml.). Because of the high reactivity of resorcinol, the reaction time was reduced to 2 hours. The product was purified as in the preceding example. It was infusible.

"Example 13

"Into the glass apparatus of Example 1, above, were introduced 94 g. (1.0 mol) phenol and 5 g. dipropylnaphthalene sulfonic acid. After heating to 150° C., with stirring, 127 g. (0.835 mol) alpha-terpineol was run in slowly, interrupting the addition whenever refluxing became rapid. The product was then emulsified by stirring into a solution of 6 g. gum acacia in 320 g. water at 93° C. It was pinkish in color and finely dispersed. Formalin, 112 ml. (36 g. in 100 ml.) was then run in in 1 minute. In 1.25 hours, a sample of the product had a melting point of 110° C. After 13 hours, the suspended solids were infusible at 300° C. They were recovered by water-washing, as in Example 1, above."

Application Serial No. 73,018 says, in part:

"In practicing this invention, the first step is to initiate the polyester condensation process in the conventional manner, in which reactants are simply heated with stirring in a reaction vessel. By careful and continuous observation of the viscosity of the mass as it increases with progress of the reaction, the condensation is carried to the point of incipient infusibility. The optimum viscosity for the product to possess at this stage is best determined by a few small-scale pilot tests. The higher the vicosity, the better the operation obtained in subsequent treatment; but over-running the optimum point will make difficult the discharge of the product from the pot. Having reached the pre-determined desired viscosity, the pot is speedily discharged by pumping its contents, still at or not far below the final reaction temperature, into an emulsifying apparatus in which the resin is dispersed in a non-aqueous liquid, preferably a hydrocarbon, to produce a resin-in-oil emulsion.

"I prefer to use a liquid petroleum hydrocarbon oil, particularly one of relatively high viscosity, such as is employed in automotive lubricating oils, as the continuous phase of this emulsion. I have commonly used a lubricating oil distillate obtained from a California crude oil, and which had a viscosity of 225 centipoises at 21° C. and 177 centipoises at 54° C.

"It is very desirable to have present, in the oily suspending medium, certain substances which will act as stabilizers for the emulsion of the partly-cured resin. Heavy metal fatty acid soaps or naphthenate soaps, resin soaps, petroleum sulfonates, etc., may be used for this purpose. Calcium and aluminum stearates function well for this purpose, especially when the two are used simultaneously. I prefer to use them because their use produces emulsions of higher stability and leads to more finely-divided final products.

"The emulsifying apparatus may be of any type which allows operation at the high final temperatures of the initial cure, and in which the liquids may be stirred sufficiently vigorously to disperse the viscous resin into particles of the desired fineness.

"The solution of emulsifying agents in hydrocarbon oil is used at a temperature sufficiently high to keep the resin viscosity from being so great that it resists emulsification too strongly. With many polyester resin compositions, I find it well to effect the emulsification with an oil temperature well above the final temperature attained in the first stage in the resin pot, but not above the temperature to be used in the suspension-curing stage. For example, a polyester resin cured to incipient infusibility at 205° C. may be emulsified into the oil at 250° C., and the cure completed at this temperature.

"When the emulsion has been formed, it is maintained in suitable apparatus at the temperature desired for final curing. Suitable provision is made for escape of volatile products, notably water; and stirring of moderate intensity is maintained throughout this period. When the cure is completed to the desired stage, as evidenced by sampling or by previously determined time-temperature relationships, the emulsion is allowed to cool, preferably while continuing stirring to prevent agglomeration of the resin, which may be somewhat plastic at curing temperatures. The suspension is finally filtered at a reduced or atmospheric temperature, the sloids are washed with suitable solvents to remove the oil, and are finally dried to yield the final product. This final product is of a degree of subdivision which is largely dependent upon the type and concentration of emulsifying agent used in its cure, and upon the conditions prevailing in the emulsifying stage.

"The individual particles are spherical, although there is a tendency to loose aggregation of particles of all sizes, so that larger particles of very irregular outline and large area predominate.

"For the preparation of small batches of this material I find it convenient to substitute grinding of the intermediate resin for the high-temperature emulsification procedure. This variation, although it does require grinding equipment, retains most of the basic advantages of the invention as it avoids the problem of removal of a completely cured resin from its container; the actual grinding is vastly easier because the resin is not yet in a mechanically strong stage; and it is not necessary to carry out an emulsification procedure at high temperatures. In this variation of procedure the resin pot is dumped promptly at the point of incipient infusibility of the resin as described above, the resin being allowed to cool in flat pans or upon a cold floor. When cooled to about 20° C. or preferably colder, it is broken up and subdivided by impact methods. For the smallest batches, shaking with steel balls readily produces a white powder. Because of the plastic flow characteristic of the incompletely cured resins, it is necessary to avoid squeezing the powdered resin, or storage for more than a short time, as sintering readily occurs. The powder is stirred at atmospheric temperature into the hydrocarbon oil containing emulsifying agents as described for the high-temperature emulsification process, the temperature is rapidly raised, and the cure is completed while continuing the stirring. The product is recovered by settling or filtration, solvent washing, and drying.

"The following examples show small-scale preparation of my products. Large-scale preparation, described above, differs only in that the partly-cured resin is added to the suspending liquid as hot liquid rather than finely-divided solid.

"Example 1

"Into an all-glass apparatus consisting of a 1.5-liter resin pot provided with a ground-glass jointed cover, automatic stirrer, condenser, electric jacket heater, and thermometer were charged: 198.0 g. (2.0 moles) glycerol and 444.0 g. (3.0 moles) phthalic anhydride.

"The phthalic anhydride was gradually added to the heated and stirred glycerol as fast as practicable without clogging the stirrer. Stirring was continued while heat was applied to bring the temperature to 203° C., in 38 minutes. Stirring and heating were continued to a total time of 1.75 hours, adjusting the heating rate to a fairly uniform rate of water evolution, as observed by measuring the volume of condensate. After 33 ml. of water had been recovered, the temperature of the resin was 200° C.; its viscosity was high, as judged by its stirring behavior; and a small sample hardened well on cooling. The stirring and heating were then stopped, the pot opened at the large ring joint, and its contents dumped into a pan of 130 sq. in. area. After the mass had cooled to room temperature, it was broken into approximately ½-inch pieces, and about 175 g. was shaken for 10 minutes with fifteen ⅝" steel balls on a shaking machine, at 150 strokes per minute. The product was screened on a 30-mesh screen, the oversize being reground.

"Into 400 ml. of lubricating oil distillate (viscosity, 177 centipoises at 54° C.) containing, dissolved, 5 g. calcium stearate and 5 g. aluminum stearate, was introduced 150 g. of the ground resin, with stirring at 35° C. As soon as all the resin was dispersed, the temperature was quickly raised to 250° C. and held near this point for 1 hour. The suspension was then cooled, allowed to settle, diluted with a light petroleum distillate, centrifuged, further washed with distillate, and finally washed with petroleum ether and dried. The product was a light-brown-colored solid, for the most part composed of spheres of a range of sizes, such that the material was about like very fine sand in its general appearance.

"Example 2

"Into the apparatus described in Example 1, there were charged 198 g. (2.0 moles) glycerol, 84.5 g. (0.3 mole) oleic acid, and 422 g. (2.85 moles phthalic anhydride. The phthalic anhydride was added to the stirred mixture of the first two ingredients at 60° C. The temperature was brought to 189° C. in 70 minutes. Heating and stirring were continued until 43.5 ml. of water had been distilled and a final temperature of 204° C. attained. The contents of the resin pot were poured into a flat pan, cooled, and ground as in Example 1. The ground resin was treated by exactly the same method described in Example 1, to produce the final cured product. The product was finely-divided, and infusible at 250° C.

"*Example 3*

"Into the apparatus of Example 1 were charged 198 g. (2.0 moles) glycerol, 141 g. (0.5 mole) stearic acid, and 407 g. (2.75 moles) phthalic anhydride. The phthalic anhydride was dissolved portion-wise with heating and stirring, as described in the preceding examples. The temperature of the miqture was brought to 190° C. in 53 minutes. Gradual heating was continued until 47 ml. of water had been evolved, the final temperature being 201° C. Because of somewhat higher rates of heating during the earlier stages of the reaction, a maximum temperature of 220° C. was present when 43 ml. of water had been distilled. The resin was then discharged into a shallow pan, cooled, ground, and suspension-cured exactly as in Example 1. The product was finely-divided and infusible.

"*Example 4*

"Into the apparatus of Example 1 were charged 188 g. (1.9 moles) glycerol, 89 g. (0.3 mole) ricinoleic acid, and 422 g. (2.85 moles) phthalic anhydride. The mixture was stirred and gradually heated, after the manner of Example 1. The total water evolved was 38.5 ml., and the final temperature, 213° C. The product after suspension-curing, as in Example 1, was finely-divided and infusible.

"*Example 5*

"Into the apparatus of Example 1 were charged 198 g. (2.0 moles) glycerol, 92 g. (0.3 equiv.) dimerized soybean oil fatty acids, and 422 g. (2.85 moles) phthalic anhydride. (A description of such dimerized fatty acids will be found in Johnston U. S. Patent No. 2,347,562, dated August 25, 1944.) The mixture was stirred and gradually heated, after the manner of Example 1. The reaction was continued until 42 ml. of water had been evolved, and a final temperature of 207° C. attained. On curing this intermediate in suspension, as in Example 1, a substantial yield of satisfactory finely-divided infusible product was obtained, although about 10% was converted into a tarry insoluble black substance which attached itself to the stirrer.

"*Example 6*

"Into the apparatus of Example 1 were charged 171 g. (1.8 moles) glycerol, 111 g. (0.3 mole) diethyleneglycol mono oleate and 422 g. (2.85 moles) phthalic anhydride. The mixture was stirred and gradually heated, after the manner of Example 1. The resin pot was dumped when 43 ml. of water had been evolved, and a final temperature of 219° C. attained. The suspension-curing of this resin, as in Example 1, yielded a finely-divided infusible product.

"*Example 7*

"Into the apparatus of Example 1 were charged 123 g. (1.35 moles) glycerol, 187.8 g. (0.3 mole) mannitol monoricinoleate, and 422 g. (2.85 moles) phthalic anhydride. The mixture was stirred and gradually heated, after the manner of Example 1. The reaction was stopped when 35 ml. of water had been evolved, and a final temperature of 211° C. attained. Suspension-curing of this intermediate, as in Example 1, produced a finely-divided infusible resin.

"*Example 8*

"Into the apparatus of Example 1 were charged 190 g. (2.0 moles) glycerol, 134 g. (1.0 mole) diglycolic acid, and 296 g. (2.0 moles) phthalic anhydride. The mixture was stirred and gradually heated, after the manner of Example 1. The viscosity of the mixture at the temperature of cure was observed as an indicator of the moment to discontinue the reaction; and it reached a level where it was feared slight additional heating would result in an infusible product. At this point, 56 ml. of water had distilled and the temperature had reached 211° C.; and curing was stopped.

"Suspension-curing of this intermediate, as in Example 1, yielded a satisfactory finely-divided infusible product.

"*Example 9*

"Into the apparatus of Example 1 were charged 142.5 g. (1.5 moles) glycerol, 107 g. (0.3 mole) glyceryl monostearate, 36.4 g. (0.3 mole) methylenedisalicylic acid, and 377 g. (2.55 moles) phthalic anhydride. The mixture was stirred and gradually heated, after the manner of Example 1. The reaction was stopped when 39 ml. of water had been evolved, and a final temperature of 207° C. had been attained. The suspension-curing of this intermediate, as in Example 1, led to a finely-divided infusible product.

"*Example 10*

"Into the apparatus of Example 1 were charged 152 g. (1.6 moles) glycerol, 60.6 g. (0.4 mole) triethanolamine, and 444 g. (3.0 moles) phthalic anhydride. The mixture was stirred and gradually heated, after the manner of Example 1. The reaction was stopped when 37 ml. of water had been evolved, and a final temperature of 208° C. had been attained. The suspension-curing of this intermediate, as in Example 1, led to a somewhat coarsely granular infusible material containing rather large friable aggregates. The volume of product also was noted to be much greater than encountered in the preceding examples, indicating that much of the suspending oil had been absorbed. Triethanolamine illustrates an ingredient which confers oil-solubility on the resin to such an extent that it renders difficult suspension-curing by the present process.

"When the charge to the resin pot was 303 g. (2.0 moles) triethanolamine and 444 g. (3.0 moles) phthalic anhydride, it was found that the resin agglomerated in the suspending oil as soon as a temperature of 100° C. had been attained. This illustrates the unsuitability of using triethanolamine as the only hydroxyl-supplying ingredient in this process."

Other infusible resins may be employed to produce our reagents. They may be prepared especially for use in preparing the present reagent, or they may be purchased in the open market. Since the two applications quoted above disclose the preparation of finely-divided infusible resins, we have quoted from them to typify the character of resins used as starting materials herein. Any suitable infusible resin may be substituted therefor, however.

If some other infusible resin is employed, it is important that it be reduced to the finely-divided state before oxyalkylation, in order to achieve satisfactory reaction with the oxyalkylating agent employed. Grinding, crushing, milling or other mechanical operation may be employed to accomplish this reduction in size; or some procedure, other than those described above, may be employed to produce the infusible resin starting material in finely-divided form.

Having prepared the infusible resin it is desired to oxyalkylate, by the above or any other desired procedures, preparation of the finished reagents for use in our process is accomplished by relatively simple means. The resin is subjected to treatment with a low molal reactive alpha-beta olefin oxide to any desired level of oxyalkylation. We prefer that addition of such alkylene oxide be continued to the point where the product becomes self-emulsifiable or miscible or soluble in water, or self-dispersible, or has emulsifying properties.

The olefin oxides employed are characterized by the fact that they contain not over 4 carbon atoms and are selected from the class consisting of ethylene oxide, propylene oxide, butylene oxide, glycide, and methlglycide. Glycide may of course be considered as a hydroxy propylene oxide, and methylglycide as a hydroxy butylene oxide. In any event, however, all such reactants contain the reactive ethylene oxide ring and may best be considered as derivatives of or substituted ethylene oxides. The solubilizing effect of the oxide is directly proportional to the percentage of oxygen present, or, specifically, to the oxygen-carbon ratio.

In ethylene oxide, the oxygen-carbon ratio is 1:2. In glycide, it is 2:3; and in methylglycide, 1:2. In such compounds, the ratio is very favorable to the production of hydrophile or surface-active properties. However, the ratio, in propylene oxide, is 1:3, and in butylene oxide, 1:4. Obviously, such latter two reactants are sometimes satisfactorily employed where the resin composition is such as to make incorporation of the desired property practical. In other cases, they may produce marginally satisfactory or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued using the more favorable members of the class, to produce the desired hydrophile product. Used alone, these two reagents may in some cases fail to produce sufficiently hydrophile derivatives because of their relatively low oxygen-carbon ratios.

Thus, ethylene oxide is much more effective than propylene oxide, and propylene oxide is more effective than butylene oxide. Hydroxy propylene oxide (glycide) is more effective than propylene oxide. Similarly, hydroxy butylene oxide (methylglycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care.

The oxyalkylation of resins of the kind from which the products used in the practice of the present invention are prepared is advantageously catalyzed by the presence of an alkali. Useful alkaline catalysts include soaps, sodium acetate, sodium hydroxide, sodium methylate, caustic potash, etc. The amount of alkaline catalyst usually is between 0.2% to 2%. The temperature employed may vary from room temperature to as high as 200° C. The reaction may be conducted with or without pressure, i. e., from zero pressure to approximately 200 or even 300 pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a non-volatile strong acid such as sulfuric acid is used to catalyze the resinification reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyalkylation in the presence of an inert solvent, like xylene, cymene, ethylene glycol diethyl ether, diethylene glycol diethyl ether, etc. We prefer to employ diethylene glycol diethyl ether, from the standpoint of desirable characteristics; but xylene is a cheap solvent, and desirable for such reason. Sometimes it is possible to employ a volume of alkylene oxide, e. g., butylene oxide, as solvent during the oxyalkylation with the same or some other alkylene oxide, e. g., ethylene oxide. Where the solvent is expensive, it may be desirable to remove it from the finished product mass by distillation, and return it to the oxyalkylation system, employing cheaper diluents to dilute the finished product prior to use.

We prefer to continue oxyalkylation until at least incipient hydrophile property is exhibited by the product. As one goes from minimum to maximum hydrophile characteristics, the products possess a corresponding range of other characteristics, giving a series of versatile and useful reagents. Where phenolic resins are the parent materials for preparing our reagents, the point of incipient hydrophile property corresponds to the introduction of about 2 mols of ethylene oxide for each phenolic nucleus. Such minimum hydrophile property means that the product begins to show emulsifying properties or self-emulsifiability in water, in concentrations of from 0.5% to 5.0%. Commonly, dispersibility in water will be found to vary inversely with temperature, and reagents which are dispersible at room temperatures may show separation of phases at higher temperatures. As oxyalkylation continues and hydrophile property is correspondingly increased, the products become capable of being dispersed in water even in the presence of inert solvent, like xylene. We prefer to continue oxyalkylation to the point where a mixture of from 50 to 90 parts of oxyalkylated derivative and 50 to 10 parts xylene is emulsifiable in one to three volumes of distilled water.

If the product is not readily water-soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein included compounds for use as demulsifying agents is based on the conversion of a hydrophobe or non-hydrophile compound or mixture of compounds into products which are usually distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test, as above described.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity), tests for emulsifying properties or self-dispersibility are useful. The fact that a reagent is capable of producing a dispersion in water is proof that it is distinctly hydrophile.

It will be apparent from the foregoing discussion of solubility of the oxyalkylated products that a wide variation exists in the proportion of alkylene oxide used, to prepare the most effective reagents for use on any particular emulsion. The differences in parent resins and the different effects obtained by using the different oxyalkylating agents in different proportions produce a wide range of finished reagents of great versatility and utility.

The following examples illustrate the manner in which the parent infusible resins are processed to obtain the desired oxyalkylated derivatives therefrom. In general terms, the procedure begins with the introduction of a quantity of the inert solvent into an autoclave of suitable design. This autoclave is preferably fitted with a flush-bottom valve, or with a gravity-actuated poppet valve in the drainpipe to prevent solids falling into the dead space in the pipe above the ordinary type of drain valve. In absence of such precaution, such solids as fall in the dead space escape treatment, at least in part, and may clog the valve and drain line.

We prefer to employ about five times as much inert solvent as of solids, and to introduce the parent infusible resin as a finely-divided solid into the rapidly stirring solvent. A suitable catalyst is also added, for example, sodium hydroxide, and oxyalkylation is begun after the autoclave is swept free from air, using a suitable inert medium like nitrogen.

Addition of alkylene oxide may be stepwise or continuous, as desired. We prefer continuous addition, because better control of temperatures and pressures is so obtained, and, in addition, frequently a superior product results.

To determine the point of oxyalkylation which gives products of optimum effectiveness as demulsifiers, it may be desirable to withdraw small samples from the autoclave as oxyalkylation proceeds. Such simple routine tests are not to be construed as suggesting that extended experimentation is required to obtain suitable oxyalkylated materials. They are intended to teach a person, unskilled in oxyalkylation or demulsification, how to prepare in an arbitrary manner a series of compounds illustrating the fact that a range of hydrophile-hydrophobe ratios is so obtainable; and that the products so derived have different levels of effectiveness as demulsifiers.

The following examples exemplify the production of the oxyalkylated derivatives of infusible resins, whose use as demulsifiers is our invention. They are obviously non-exclusive, but are illustrative only. The techniques described in the examples may be applied to a large variety of infusible resins.

OXYALKYLATED INFUSIBLE RESIN DERIVATIVE

*Example 1*

The infusible resin prepared according to Example 11 of application Serial No. 73,017, quoted above, was used.

The infusible resin so prepared was oxyalkylated in a stainless steel autoclave, by suspending 161.3 g. of it in 700 g. of diethylene glycol diethylether with vigorous stirring. Sodium methylate (4 g.) was added, and the suspension was heated to 128° C. Ethylene oxide was then introduced in small portions, the progress of the reaction being followed by observing the diminution of pressure of the system as the ethylene oxide was absorbed. The temperature was maintained at between 130° and 160° C. so far as possible. After each portion of ethylene oxide had been substantially absorbed, as shown by a pressure decline to a few p. s. i., a sample of the product was taken before the next portion of ethylene oxide was introduced. Such samples showed a progressive change in character, from the first, which contained slimy solids suspended in thickened solvent, to the last, which was homogeneous and gelatinous. The following table shows the sample range:

| Sample No. | Weight Ratio, EtO-to-Resin |
|---|---|
| E-231A | 0.71 |
| E-231B | 1.44 |
| E-231C | 2.19 |
| E-231D | 3.24 |
| E-231E | 4.31 |
| E-231F | 5.43 |

The 6 oxyalkylated products so prepared are effective demulsifiers as shown by the procedure and results described below.

OXYALKYLATED INFUSIBLE RESIN DERIVATIVE

*Example 2*

The infusible resin prepared according to Example 12 of application Serial No. 73,017, quoted above, was used.

The infusible resin so prepared was oxyalkylated in the same autoclave used in the preceding example, by suspending 144.5 g. of resin in 700 g. of stirring diethylene glycol diethylether, adding 6 g. sodium methylate, heating to 130–160° C., and introducing ethylene oxide in successive portions, exactly as in Example 1, just above. Samples were taken at 5 levels of ethylene oxide, as follows:

| Sample No. | Weight Ratio, EtO-to-Resin |
|---|---|
| E-232A | 0.51 |
| E-232B | 1.03 |
| E-232C | 1.74 |
| E-232D | 2.48 |
| E-232E | 3.25 |

Sample "A" was a suspension of reddish-colored solids. Later samples were progressively more viscous slurries, sample "E" being tan-colored, with slow-settling solids suspended in it. These 5 samples are effective demulsifiers, as shown by the procedure and results described below.

OXYALKYLATED INFUSIBLE RESIN DERIVATIVE

*Example 3*

The infusible resin prepared according to Example 13 of application Serial No. 73,017, quoted above, was used.

The infusible resin so prepared was oxyalkylated in the autoclave of Example 1, by suspending 231.5 g. of resin in 700 g. diethylene glycol diethylether, adding 5.5 g. sodium methylate, and introducing ethylene oxide stepwise, as in Example 1 above. Eight samples were taken at different levels of ethylene oxide, as before, all of which were 2-phase systems consisting of a minor proportion of mobile solvent and a major proportion of viscous gelatinous material. The following table shows the sample ranges:

| Sample No. | Weight Ratio, EtO-to-Resin |
|---|---|
| E-240A | 0.42 |
| E-240B | 0.85 |
| E-240C | 1.30 |
| E-240D | 1.79 |
| E-240E | 2.30 |
| E-240F | 2.85 |
| E-240G | 3.44 |
| E-240H | 4.06 |

The 8 oxyalkylated products so prepared are effective demulsifiers, as shown by the procedure and results described below.

OXYALKYLATED INFUSIBLE RESIN DERIVATIVE

*Example 4*

The infusible polyester resin prepared according to Example 1, application Serial No. 73,018, quoted above, was used in the present instance. The finely-divided infusible resin, 124.6 g., was suspended in 700 g. of diethylene glycol diethylether, by stirring in the autoclave used in preparation of the preceding oxyalkylated derivatives. After adding 3.1 g. sodium methylate and raising the temperature to about 165–170° C., oxyalkylation was carried out as in the examples immediately above, using ethylene oxide in several portions as before. The products, sampled after each of 3 additions of ethylene oxide, are shown by the following table:

| Sample No. | Weight Ratio, EtO-to-Resin |
|---|---|
| E-218A | 3.20 |
| E-218B | 5.52 |
| E-218C | 8.03 |

The 3 products so prepared are effective demulsifiers, as shown by the procedure and results described below.

OXYALKYLATED INFUSIBLE RESIN DERIVATIVE

*Example 5*

The infusible polyester resin prepared according to Example 3, application Serial No. 73,018, quoted above, was used in the present instance. The finely-divided infusible resin, 118.2 g., was suspended in 700 g. of diethylene glycol diethylether, by stirring in the autoclave used in preparation of the preceding oxyalkylated derivatives. After adding 2.9 g. sodium methylate and raising the temperature to 165–170° C., 3 portions of ethylene oxide were introduced, sample being taken after each addition when pressure decline indicated absorption of that portion had been completed.

The 3 products, sampled after the respective additions of ethylene oxide, are shown by the following table:

| Sample No. | Weight Ratio, EtO-to-Resin |
|---|---|
| E-223A | 2.82 |
| E-223B | 4.84 |
| E-223C | 7.03 |

The 3 products, so prepared, are effective demulsifiers, as shown by the procedure and results described below.

OXYALKYLATED INFUSIBLE RESIN DERIVATIVE

Example 6

In place of ethylene oxide, propylene oxide is used in the foregoing examples, employing 58 g. of the latter for every 44 g. of ethylene oxide. The products are effective demulsifiers, as may be demonstrated by applying the demulsification procedure described below.

The conventional demulsifying agents employed in the treatment of oil field emulsions are used as such, or preferably after dilution with any suitable solvent, such as water, petroleum hydrocarbons, benzene, toluene, xylene, cresol, etc. Alcohols, particularly methyl, ethyl, denatured, isopropyl, butyl, secondary butyl, hexyl, octyl, etc., may be used as diluents. Miscellaneous solvents like pine oil, carbon tetrachloride, sulfur dioxide extract from petroleum refining, may be so employed. Our materials may similarly be admixed with one or more of such conventional solvents and diluents. Moreover, our materials may be mixed with other of our materials or with conventional demulsifying agents, which include a number of well-known classes.

The following specific examples are included to illustrate the technique of showing the effectiveness of our demulsifiers on oil field emulsions.

DEMULSIFICATION PROCESS

Example 1

A sample of natural crude oil emulsion, obtained from the Signal Hill field, California, was stable indefinitely in absence of treatment with demulsifiers, although it contained 50% water in emulsified form. The oxyalkylated infusible resin derivatives of Example 1, Oxyalkylated infusible resin derivative, (E-231 A-to-E) were added to samples of this emulsion, using each in the proportion of 1 part of reagent to 10,000 parts of emulsion. Treating temperature was 100° F., and treating time was 21 hours after mixing reagent and emulsion by shaking 500 times. Water separated in each case, showing each reagent is a useful demulsifier for crude petroleum emulsions.

DEMULSIFICATION PROCESS

Example 2

A sample of natural crude oil emulsion, obtained from the Wilmington field, California, contained 49% of emulsified water, none of which would separate even on standing indefinitely, in absence of treatment. The emulsion was subjected to the action of the reagents described in Example 2, Oxyalkylated infusible resin derivative, (E-232 A-to-E), using in each case 1 part of reagent to 10,000 parts of the emulsion, and a treating temperature of 150° F., and mixing the reagents and emulsion by shaking 500 times. On subsequent standing for 20 hours, the treated emulsion samples separated water in all cases, showing the reagents to be useful demulsifiers for crude oil emulsions.

DEMULSIFICATION PROCESS

Example 3

A natural crude oil emulsion obtained from the Kettleman Hills field, California, contained 59% emulsified water, which did not separate on long standing, in absence of treatment. This emulsion was treated with the reagents described in Example 5, Oxyalkylated infusible resin derivative, (E-223 A-to-C), using 1 part of reagent to 10,000 parts of emulsion and a treating temperature of 115° F. On standing overnight, after shaking 500 times, the treated emulsion separated water in all cases, showing the reagents to be useful demulsifiers for crude oil emulsions.

In similar procedures, the other oxyalkylated infusible resin derivatives of the foregoing examples have been shown to be useful demulsifiers for crude oil emulsions, although detailed data on such treating procedures are not presented here, as being cumulative.

It is to be understood that chemical demulsifiers of many types are used in industrial practice in large volumes daily. The industrial or commercial use of our reagents is in accordance with such standard practice. The following description will illustrate such general industrial procedures for applying demulsifying agents to petroleum emulsions.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier dropwise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Having thus described our invention, what we claim is novel and desire to protect by Letters Patent is:

1. Process for breaking petroleum emulsions of the water-in-oil type, characterized by subjecting the emulsion to the action of a demulsifier including a hydrophile oxyalkylated synthetic resin prepared by the oxyalkylation of an oxyalkylation-susceptible, infusible synthetic resin by means of an alpha-beta alkylene oxide having not more than four carbon atoms and selected from the class consisting of ethylene oxide, propylene oxide, butylene oxide, glycide, and methylglycide.

2. Process for breaking petroleum emulsions of the water-in-oil type, characterized by subjecting the emulsion to the action of a demulsifier including a hydrophile oxyethylated synthetic resin prepared by the oxyethylation of an oxyethylation-susceptible infusible synthetic resin by means of ethylene oxide.

3. Process for breaking petroleum emulsions of the water-in-oil type, characterized by subjecting the emulsion to the action of a demulsifier including a hydrophile oxyethylated synthetic resin prepared by the oxyethylation of an oxyethylation-susceptible infusible aldehyde-derived synthetic resin by means of ethylene oxide.

4. Process for breaking petroleum emulsions of the water-in-oil type, characterized by subjecting the emulsion to the action of a demulsifier including a hydrophile oxyethylated synthetic resin prepared by the oxyethylation of an oxyethylation-susceptible infusible formaldehyde-derived synthetic resin by means of ethylene oxide.

5. Process for breaking petroleum emulsions of the water-in-oil type, characterized by subjecting the emulsion to the action of a demulsifier including a hydrophile oxyethylated synthetic resin prepared by the oxyethylation of an oxyethylation-susceptible infusible phenol-formaldehyde synthetic resin by means of ethylene oxide.

6. Process for breaking petroleum emulsions of the water-in-oil type, characterized by subjecting the emulsion to the action of a demulsifier including a hydrophile oxyethylated synthetic resin prepared by the oxyethylation of an oxyethylation-susceptible infusible urea-formaldehyde synthetic resin by means of ethylene oxide.

7. Process for breaking petroleum emulsions of the water-in-oil type, characterized by subjecting the emulsion to the action of a demulsifier including a hydrophile oxyethylated synthetic resin prepared by the oxyethylation of an oxyethylation-susceptible infusible polyester synthetic resin by means of ethylene oxide.

BERNHARD KEISER.
MELVIN DE GROOTE.

REFERENCES CITED

The following references are of record in the file of this patent:

UNITED STATES PATENTS

| Number | Name | Date |
| --- | --- | --- |
| 2,454,541 | Bock et al. | Nov. 23, 1948 |